(12) United States Patent
Prasad et al.

(10) Patent No.: US 9,778,858 B1
(45) Date of Patent: Oct. 3, 2017

(54) APPARATUS AND METHOD FOR SCATTER GATHER LIST HANDLING FOR AN OUT OF ORDER SYSTEM

(71) Applicant: Microsemi Solutions (U.S.), Inc., Aliso Viejo, CA (US)

(72) Inventors: Janardan Prasad, Bangalore (IN); David Joseph Clinton, Coopersburg, PA (US); Cheng Yi, Vancouver (CA)

(73) Assignee: MICROSEMI SOLUTIONS (U.S.), INC., Aliso Viejo, CA (US)

( * ) Notice: Subject to any disclaimer, the term of this patent is extended or adjusted under 35 U.S.C. 154(b) by 120 days.

(21) Appl. No.: 14/619,901

(22) Filed: Feb. 11, 2015

(51) Int. Cl.
- *G06F 3/06* (2006.01)
- *G06F 12/10* (2016.01)
- *G06F 12/1081* (2016.01)

(52) U.S. Cl.
CPC .......... *G06F 3/0613* (2013.01); *G06F 3/0659* (2013.01); *G06F 3/0679* (2013.01); *G06F 12/1081* (2013.01)

(58) Field of Classification Search
CPC .... G06F 3/0613; G06F 3/0659; G06F 3/0679; G06F 3/0655; G06F 12/0238; G06F 12/0246; G06F 12/1081; G06F 13/28
See application file for complete search history.

(56) References Cited

U.S. PATENT DOCUMENTS

| | | | |
|---|---|---|---|
| 6,289,382 B1 * | 9/2001 | Bowman-Amuah | G06F 13/387 709/226 |
| 6,912,687 B1 * | 6/2005 | Gates | G06F 11/1076 714/6.2 |
| 8,176,252 B1 | 5/2012 | Alexander et al. | |
| 8,271,700 B1 * | 9/2012 | Annem | G06F 13/28 710/22 |
| 8,495,301 B1 | 7/2013 | Alexander et al. | |
| 2003/0033477 A1 * | 2/2003 | Johnson | G06F 3/0601 711/114 |
| 2003/0182349 A1 * | 9/2003 | Leong | G06F 3/061 718/100 |
| 2008/0127221 A1 * | 5/2008 | Otte | G06F 9/44573 719/321 |
| 2012/0158682 A1 * | 6/2012 | Yarnell | G06F 17/30362 707/704 |
| 2012/0311201 A1 * | 12/2012 | Amann | G06F 13/387 710/52 |
| 2012/0311217 A1 * | 12/2012 | Bubb | G06F 3/00 710/305 |

(Continued)

FOREIGN PATENT DOCUMENTS

WO 2012164432 12/2012

*Primary Examiner* — Michael Krofcheck
(74) *Attorney, Agent, or Firm* — Dennis R. Haszko

(57) ABSTRACT

A method and apparatus for handling SGLs for out of order systems is disclosed. The method involves generating multiple Child IOs from an original IO, each Child IO being at the granularity of a storage side memory; generating separate SG lists for each Child IO; and processing each Child IO independently of other Child IOs and in order with each Child IO for data transfer. As each Child IO is generated at the granularity of the storage side memory, the Child IOs can be processed independently of each other and in-order within each Child IO. Thus, an out-of order IO transfer is transformed into an in-order IO transfer.

28 Claims, 18 Drawing Sheets

(56) References Cited

U.S. PATENT DOCUMENTS

| | | | |
|---|---|---|---|
| 2013/0007572 A1* | 1/2013 | Kotzur | H03M 13/11 714/800 |
| 2013/0054841 A1* | 2/2013 | Padia | G06F 3/061 710/5 |
| 2013/0343131 A1* | 12/2013 | Wu | G11C 16/26 365/185.24 |

* cited by examiner

| SG Element 0 |
|---|
| SG Element 1 |
| SG Element 2 |
| SG Element 3 |
| SG Element 4 |
| SG Element 5 |
| SG Element 6 |
| SG Element 7 |
| SG Element 8 |
| SG Element 9 |
| SG Element 10 |
| SG Element 11 |
| SG Element 12 |
| ⋮ |
| SG Element 27 |
| SG Element 28 |
| SG Element 29 |
| SG Element 30 |
| SG Element 31 |
| SG Element 32 |
| SG Element 33 |
| SG Element 34 |

FIG. 8

| SG Element 0 (Eq to SG Element 0) |
|---|
| SG Element 1 (Eq to SG Element 1) |

SGL For Child IO A

| SG Element 0 (Eq to SG Element 2) |
|---|
| SG Element 1 (Eq to SG Element 3) |

SGL For Child IO B

| SG Element 0 (Eq to SG Element 4) |
|---|
| SG Element 1 (Eq to SG Element 5) |
| SG Element 2 (Eq to SG Element 6) |
| SG Element 3 (Eq to SG Element 7) |
| SG Element 4 (Eq to SG Element 8) |
| SG Element 5 (Eq to SG Element 9) |
| SG Element 6 (Eq to SG Element 10) |
| SG Element 7 (Eq to SG Element 11) |
| SG Element 8 (Eq to SG Element 12) |

SGL For Child IO C

| SG Element 0 (Eq to SG Element 13) |
|---|
| SG Element 1 (Eq to SG Element 14) |

SGL For Child IO D

| SG Element 0 (Eq to SG Element 15) |
|---|
| SG Element 1 (Eq to SG Element 16) |
| SG Element 2 (Eq to SG Element 17) |

SGL For Child IO E

| SG Element 0 (Eq to SG Element 18) |
|---|
| SG Element 1 (Eq to SG Element 19) |
| SG Element 2 (Eq to SG Element 20) |

SGL For Child IO F

| SG Element 0 (Eq to SG Element 21) |
|---|
| SG Element 1 (Eq to SG Element 22) |
| SG Element 2 (Eq to SG Element 23) |

SGL For Child IO G

| SG Element 0 (Eq to SG Element 24) |
|---|
| SG Element 1 (Eq to SG Element 25) |
| SG Element 2 (Eq to SG Element 26) |
| SG Element 3 (Eq to SG Element 27) |

SGL For Child IO H

FIG. 15

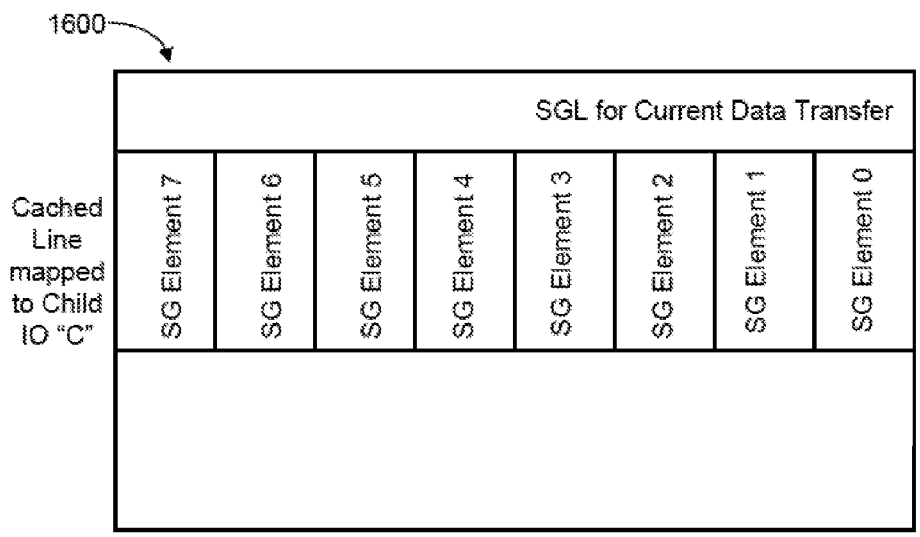
FIGURE 16a Out of Order System: Cache State 1
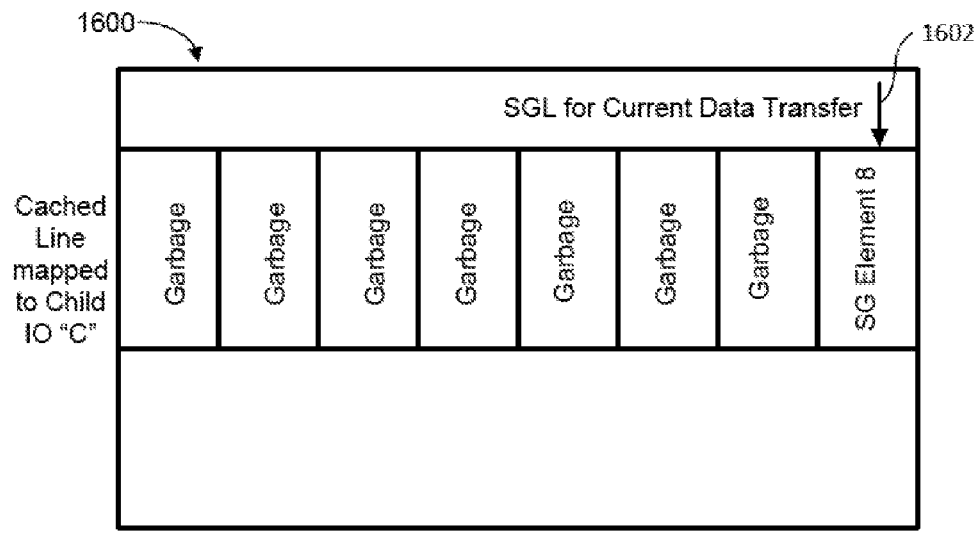
FIGURE 16b Out of Order System: Cache State 2

APPARATUS AND METHOD FOR SCATTER GATHER LIST HANDLING FOR AN OUT OF ORDER SYSTEM

FIELD

The present disclosure relates generally to method and apparatus for handling data transfer to non-contiguous memory buffers. More particularly, the present disclosure relates to handling data transfer to non-contiguous memory buffers in an out-of-order system using Scatter Gather Lists.

BACKGROUND

Data accessed from or written to a memory involves transfer of data from a block of memory from one device (for example, a hard drive) to another (for example, a RAM cache). The block of memory that resides in these devices may be further subdivided into smaller chunks that may not be contiguously located. For example, a 4 MB chunk may be located as 4 separate 1 MB chunks anywhere in the memory space of the device. Therefore, some information is needed as to their physical locations so that a memory controller (for example, a Direct Memory Access (DMA) Master or the DMA controller) can then use this information to either collect the data from these separate chunks (Gather) or write data into these separate chunks (Scatter). This is where Scatter/Gather elements are utilized.

The Scatter/Gather element (SG element) contains the physical location of one memory chunk (also called a fragment) along with the size of the data contained in that chunk. A number of SG elements together can describe the locations and sizes of the chunks of memory that make up the block of data to be transferred.

The format of an SG element can be different depending upon the application. For the purpose of uniformity, the IEEE 1212.1 compliant SG element, which is illustrated in FIG. 1, will be described by way of example only. As shown in FIG. 1, a typical SG element has the following fields: a 64-bit Address field 100 that points to the starting location of the fragment in memory; a 32-bit Length field 102 that indicates the amount of data contained in or transferrable to that particular fragment; a 31 bit Reserved field 104 that is set to zeroes; and a 1 bit Extension (Ext) field 106 that indicates whether this element is a pointer to the next SG element or a pointer to a data buffer. This Extension field 106 is needed because the SG elements themselves may not be stored contiguously in memory. In this case, the Address field 100 of an SG element can be used to point to the location of the next SG element in the list. For such an SG element, the Length field 102 is ignored and the Ext 106 bit will be set. An SG element pointing to a data buffer may also have the Length field set to all zeroes, which can mean: that the DMA controller should ignore the contents of this element and move on to the next element in the list; or that the block is empty.

FIG. 2 shows how an SG List (also called SGL, a chained list of SG elements) can be used to completely specify a block of memory in a device. A typical SGL may have only single SG element or may have a large number of SGL elements. A SGL may have segmentation and it can contain one or more SGL segments. Typically, segments are created using a special SG Element called an extension element or a segment descriptor. A typical SG element may also include segment information if the list is segmented either directly or indirectly.

As shown in FIG. 2, Fragments 0 through 4 are located at non-contiguous and random locations in physical memory 108 (which may reside in different memory spaces). The SGL 110 however puts all of these together by having SG elements 112 that point to the starting location of each fragment. As we traverse the list, we appear to have a contiguous logical memory block, whose total size is the combined sizes of all of the fragments. An illustration of such a logical memory block 114 is shown in FIG. 2 for illustrative purposes, though it is understood not to exist physically.

Notice in the example of FIG. 2 that the SGL 110 itself is not contiguously located in physical memory. The fifth SG element of the first set of SG elements points to the next SG element in the list by using the extension capability of the SGL. Also notice that we cannot traverse the list backwards—for example, we cannot go back to the fifth SG element once we traverse on to the sixth one, as we have no information in the sixth SG element that points back to the address of the fifth SG element.

SGLs are commonly used for handling data transfers to non-contiguous memory buffers. A typical Peripheral Component Interconnect Solid State Device (PCI SSD) stripes read request over multiple flash Logic Units (LUNs) which causes input/output (IO) data coming back from the storage side flash drives in an out-of-order fashion. A typical IO transfer involves a command phase and a data phase. During the command phase, the IO process is set up by fetching or creating all the requisite control structures. The actual data transfer is performed during the data phase. Usually, the SGL is a bottleneck in IO transfer. Typically, this bottleneck is resolved by caching the SGL locally. SGL caches are like any other cache structure. Each cache line has few SG elements of an SGL belonging to certain context of data. The SGL cache can implement any existing allocation scheme and cache line replacement policy. In one example, each cache line gets mapped to an IO and stores several SG elements belonging to that particular IO.

FIG. 3 shows a simplified view of a SGL Cache. A typical SGL Cache contains a cache memory 300; a TAG memory and TAG lookup logic 302; a logic 304 handling accesses to the SGL cache; and a logic 306 handling all incoming SGL read from outside world (host or main memory, not shown). The cached SG elements are stored in the cache memory 300. When cache is requested for SG elements, first TAG lookup is performed. If the required SG element is found in the cache memory (that is, the look up results in a "hit"), then the SG element is provided to the requesting agent. The lookup and fetching of the SG element is handled by the access logic 304 shown in FIG. 3. Otherwise, the required SG element is fetched from the host or main memory where the SG element is stored. The SG element read from the host or the main memory storing the SG element and is appropriately written in to the cache memory. The read operation from the host or main memory and the write operation to the cache memory are handled by the read logic 306 in FIG. 3.

Typically, when Flash drives (also called "storage side memory" herein) are accessed, striping techniques are used to achieve higher performance. Since access latency of each Flash drive may be different, the order of data read is at the mercy of the Flash drive characteristics. Consequently, the IO read operation becomes an "out-of-order" transfer. SGL caching becomes inefficient in out-of-order IO transfers, as SG Elements have to be traversed back and forth in the list. Also, every time we have to go backward in the list, we need to begin from the start of the list as SG elements do not contain information regarding the preceding element. Out of order transfer makes the cache traverse up and down the SGL, discarding existing cache contents, fetching new elements and later fetching older elements. This phenomenon is called thrashing and causes heavy performance degradation.

It is, therefore, desirable to provide an improved method and apparatus for handling SGLs for out of order systems.

SUMMARY

In an aspect, the present disclosure provides a method for handling Scatter-Gather Lists (SGLs) for data transfer in an out of order system. The method comprises generating multiple Child IOs from a Parent IO, each Child IO being at the granularity of a storage side memory; generating separate SGLs for each Child IO; and processing each Child IO independently of other Child IOs and in-order within each Child IO for the data transfer.

In an example, the granularity of the storage side memory is the smallest unit that can be read or programmed in to the storage side memory. The granularity of the storage side memory may be a page size of a Solid State Device (SSD) or a minimum accessible size defined in a Flash Translation Layer in a SSD controller.

In the example, the data transfer in the out-of-order system may include a plurality of Parent IOs. The method further comprises generating the multiple Child IOs sequentially and fairly across all the plurality of Parent IOs.

In an example, the method further comprises storing the SGLs of the multiple Child IOs in an on-chip or an off-chip memory. The on-chip memory may be divided into pages for storing the SGLs of the multiple Child IO and page information may be provided through descriptors.

In an example, a status of processing of each Child IO may be tracked to determine the completion of the parent IO data transfer. A completion status may be provided to a host controller when all Child IOs of the Parent IO have been processed.

In an example, the SGLs for each Child IO may be generated prior to a data phase and at the end of a command phase of the data transfer.

In an example, an SGL for the Parent IO may be fetched from a host memory prior to generating the multiple Child IOs.

In an example, the SGLs for the multiple Child IOs may be generated using descriptors in the SGL for the Parent IO.

In an example, the SGL for the Parent IO may be processed in sequential order prior to generating the Child IOs.

In an example, a cache line may be allocated for the Parent IO when the Parent IO has no context in an internal SGL cache, and context information for the Parent IO may be written in a table called eviction buffer table.

In an example, completion and page_index information may be updated using descriptors upon generation of the SGLs for the Child IOs.

In another aspect, the present disclosure provides a Scatter-Gather List (SGL) processor for handling SGLs for data transfer in an out of order system. The SGL Processor is configured to generate multiple Child IOs from a Parent IO, each Child IO being at the granularity of a storage side memory; generate separate SGLs for each Child IO; and control a SGL cache controller to process each Child IO independently of other Child IOs and in-order within each Child IO for the data transfer.

In another aspect, the present disclosure provides a Scatter-Gather List (SGL) handling system for handling SGLs for data transfer in an out of order system, the SGL handling system comprises a SGL processor and a SGL cache controller operatively couple to the SGL processor. The SGL processor is configured to generate multiple Child IOs from a Parent IO, each Child IO being at the granularity of a storage side memory; generate separate SGLs for each Child IO. The SGL cache controller is configured to process each Child IO independently of other Child IOs and in-order within each Child IO for the data transfer.

In an example, the SGL handling system further comprises an on-chip or an off-chip memory to store the SGLs of the multiple Child IOs.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 8 shows an SGL of an IO "A."

FIG. 15 shows multiple Child IOs generated for the SGL of the IO "A" of FIG. 8 according to an aspect of the present disclosure.

FIGS. 16(a) and (b) show cache states after a first fetch and a pre-fetch operation in Child IO "C" of FIG. 14 according to an aspect of the present disclosure.

DETAILED DESCRIPTION

Generally, the present disclosure provides a method and apparatus for handling SGLs for out of order systems. The method involves generating multiple Child IOs from an original IO (referred to as Parent IO in the present disclosure), each Child IO being at the granularity of a storage side memory; generating separate SG lists for each Child IO; and processing each Child IO independently of other Child IOs and in order with each Child IO for data transfer. The term "granularity" is used in the present disclosure as referring to both the granularity of the storage side memory, for example, the SSD page size and "minimum accessible chunk size" that essentially becomes smallest unit that can be read or programmed in to the SSD drive as well as the minimum offsets which a target device can use. As each Child IO is generated at the granularity of the storage side memory, the Child IOs can be processed independently of each other (that is, for a given Parent IO, its Child IOs may be processed out of order) and in-order within each Child IO. Thus, an out-of order IO transfer is transformed into an in-order IO transfer and the problem of thrashing is avoided.

While aspects of the present disclosure are described using Small Computer System Interface (SCSI) IOs as examples, the method and apparatus of the present disclosure may be applied to any generic interface with an out-of-order handling of SGLs.

As described earlier, in current SGL Cache implementations, each cache line is mapped to an IO. Let us assume each cache line contains eight SG Elements for illustration purposes. However, this number is implementation dependent and not limiting on the present disclosure. Each cache line may contain multiple SG elements. In the case of sequential IO access or in-order systems, SG elements are used or consumed one by one by the cache controller and the cache pre-fetches subsequent SG elements in the SGL. We ensure that SG elements are always available before they are needed for data transfers by pre-fetching subsequent SG elements in the SGL. The pre-fetching technique avoids SGL being the bottleneck due to large latency of host memory access.

Figure 1:
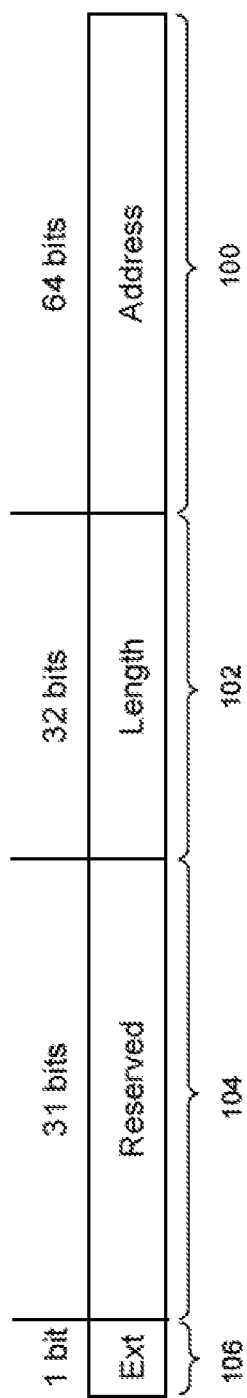
FIG. 1 shows a typical SG Element.
Figure 2:
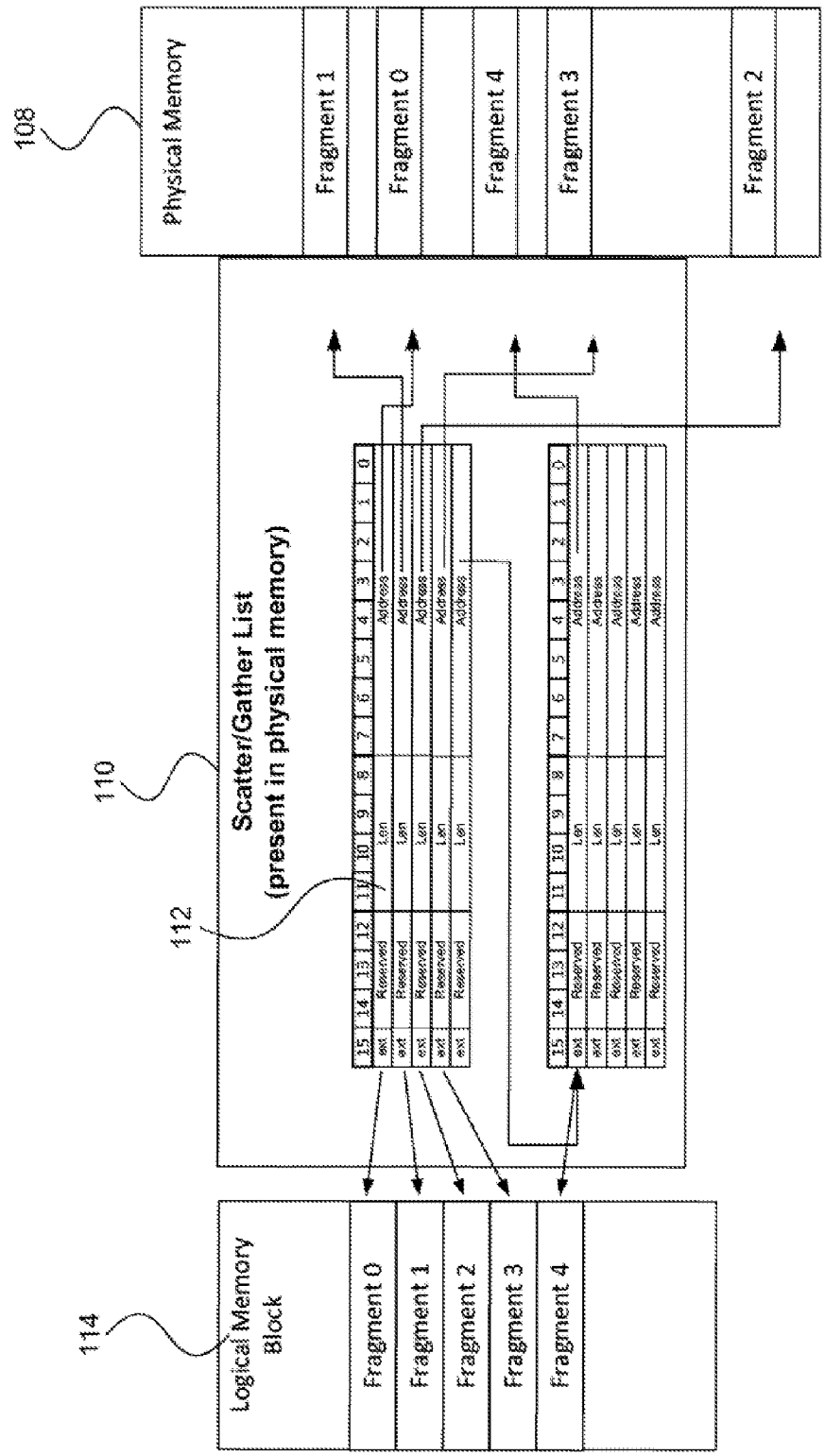
FIG. 2 shows a typical Scatter/Gather List.
Figure 3:
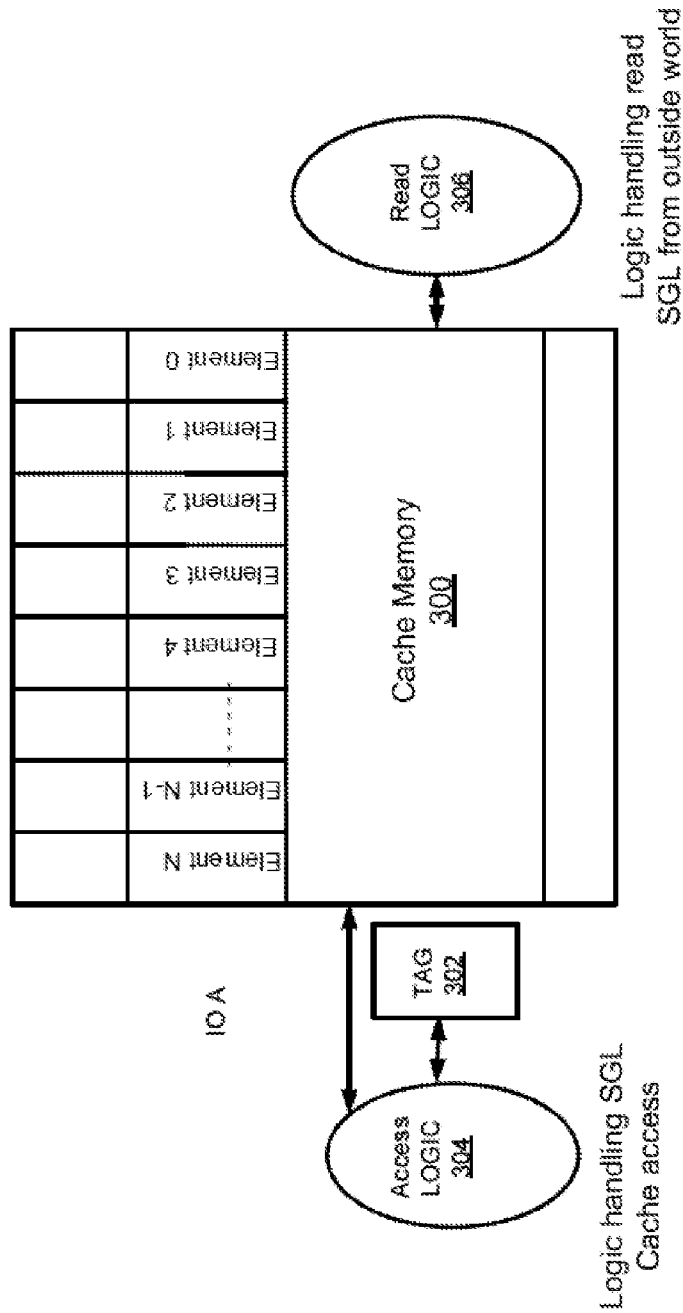
FIG. 3 shows a simplified view of a SGL Cache.
Figure 4:
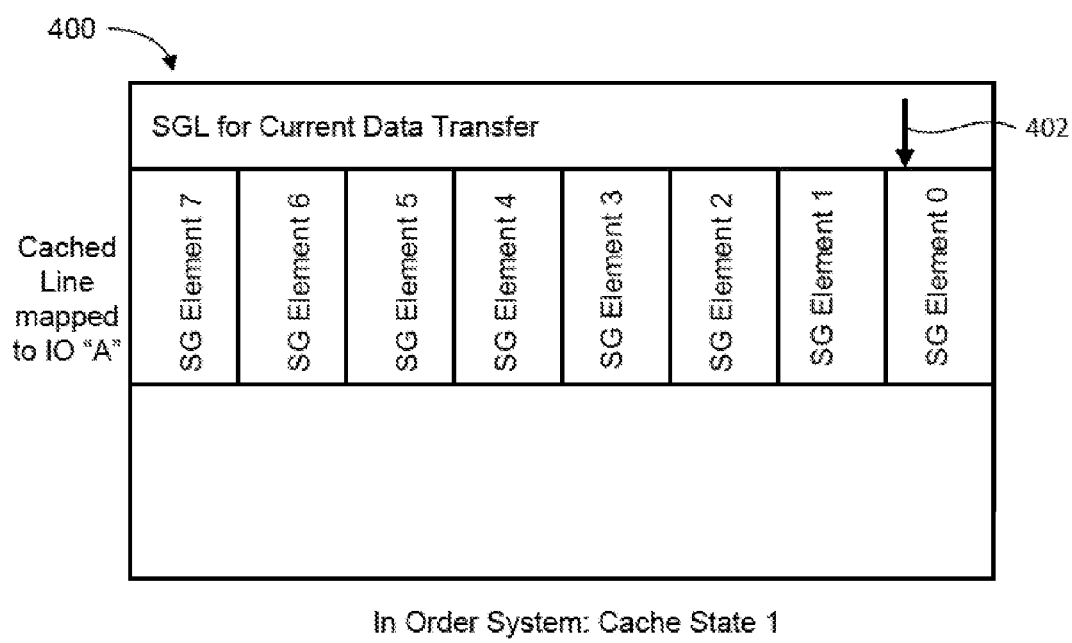
FIG. 4 shows an initial cache state in an in-order system.
Figure 5:
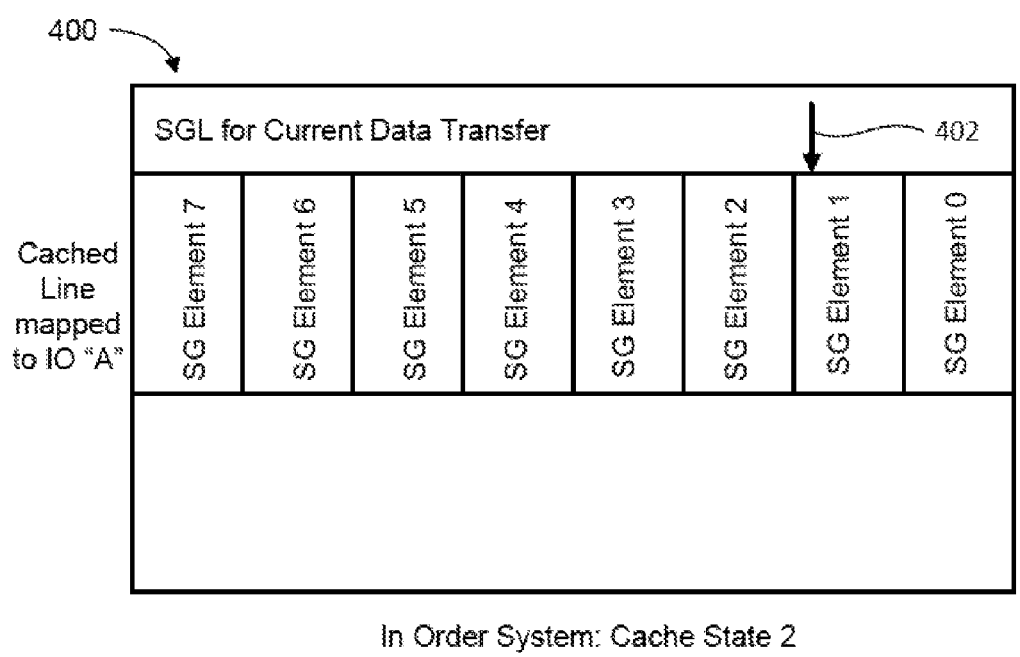
FIG. 5 shows a cache state after SG0 is consumed in the in-order system of FIG. 4.

FIG. 4 shows a cache line structure 400 containing eight SG elements. As stated earlier, eight SG elements are used as an example only. Typically, the number of SG elements in a cache is implementation dependent and eight is a non-limiting example. At the start of a data transfer operation, all the eight elements are cached and consumed for data transfer as and when needed. This state is referred to as cache state 1 of the in-order system. Once SG element 0 (SG0) is consumed for transfer, SG1 is consumed and the pointer 402 keeps moving further as shown in FIG. 5. This state is referred to as cache state 2 of the in-order system.

Figure 6:
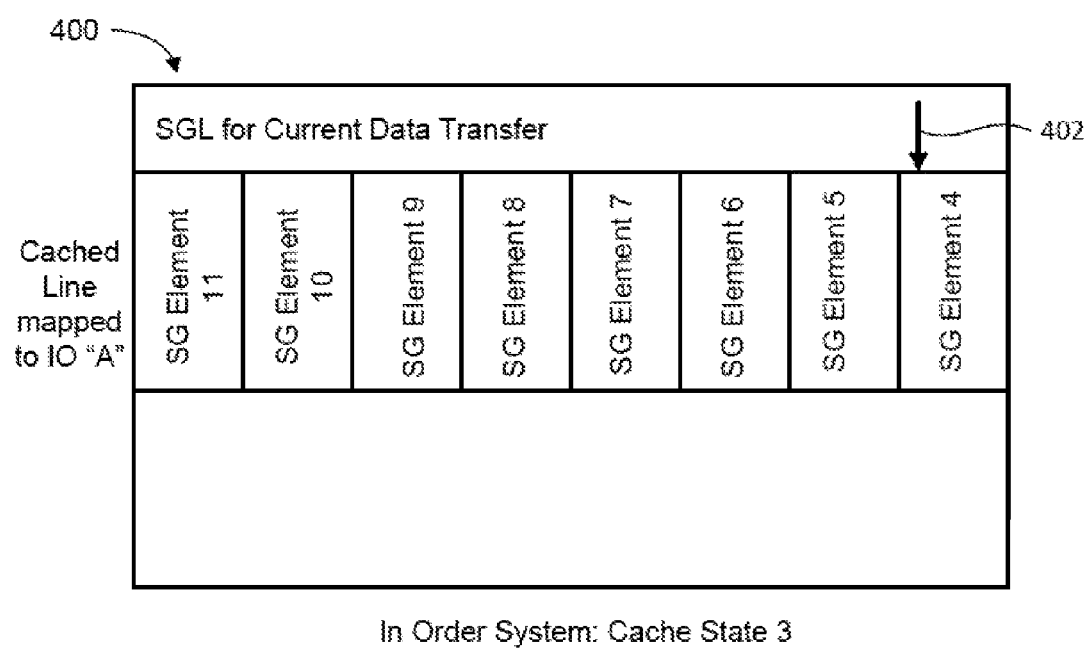
FIG. 6 shows a cache state after a first pre-fetch operation in the in-order system of FIG. 4.

Typically, the SGL Cache starts prefetching when half of the SG elements in the cache line are consumed. For example, with reference to FIGS. 4 and 5, when SG3 is consumed, the cache line pre-fetches the next four SG elements in the SGL. FIG. 6 shows the state of the cache line after receiving SG elements fetched during the first pre-fetch operation. This state is referred to as cache state 3 of the in-order system.

Figure 7:
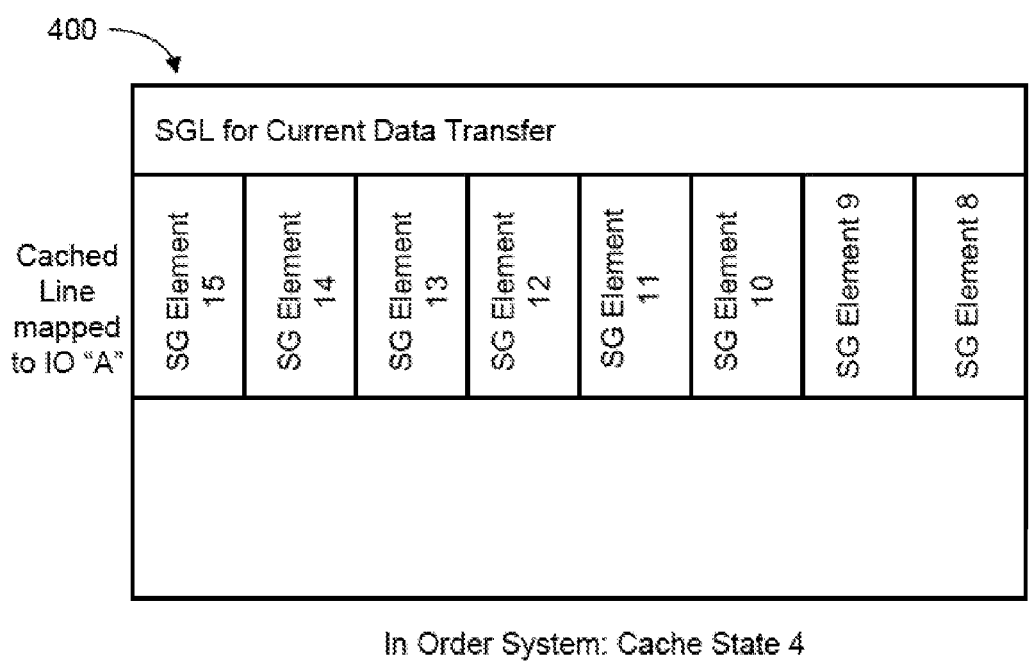
FIG. 7 shows a cache state after a second pre-fetch operation in the in-order system of FIG. 4.

Similarly, when SG7 is consumed, the cache line pre-fetches the next four SG elements in the SGL. FIG. 7 shows the state of the cache line after receiving the SG elements fetched during the second pre-fetch operation. This state is referred to as cache state 4 of the in-order system. The pre-fetching operation continues until all the SG elements in the SGL are consumed/cached ensuring that the SGL is not a bottleneck for data transfer for sequential IO access.

However, in the case of out of order IO transfer, SG elements present at the cache line may not be relevant most of the time for current Logical Buffer Offset (LBO) data transfer. Buffer offsets are used to point to the start of data location where data that is transferred is stored or written to. To satisfy the current LBO transfer, the SGL cache has to fetch more SG elements forward or backward from the SG elements cached at any given moment. Since the length of the buffer pointed by each SG element is not fixed (in most standardized SGL formats), it is difficult to calculate where to fetch the next element from the list and may require traversing the SGL from the beginning of the SGL.

Figure 9:
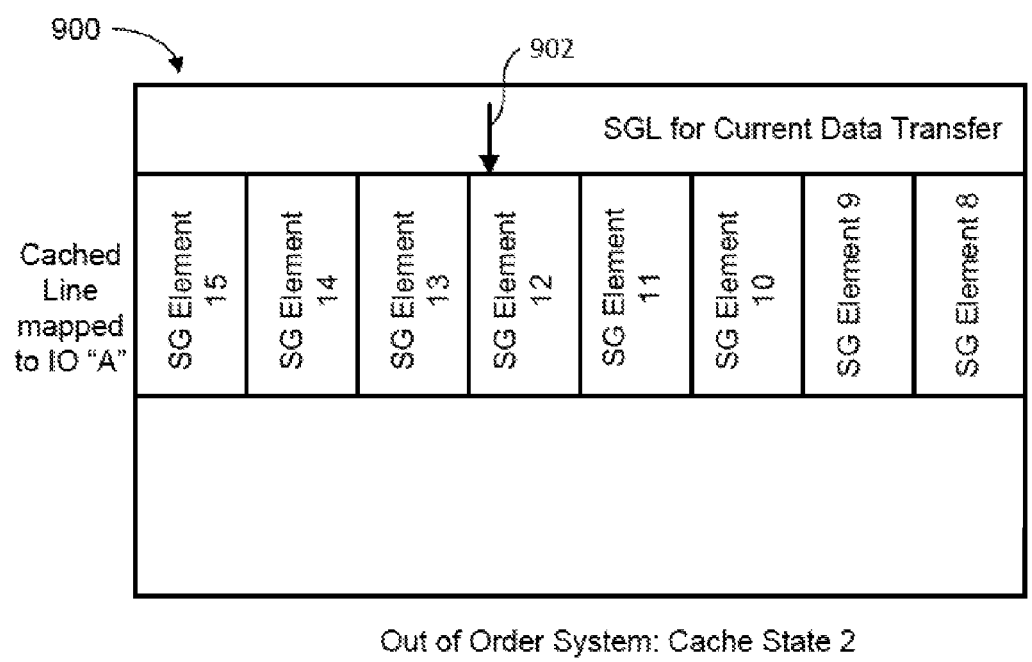
FIG. 9 shows a cache state after a first fetch operation in an out of order system.
Figure 10:
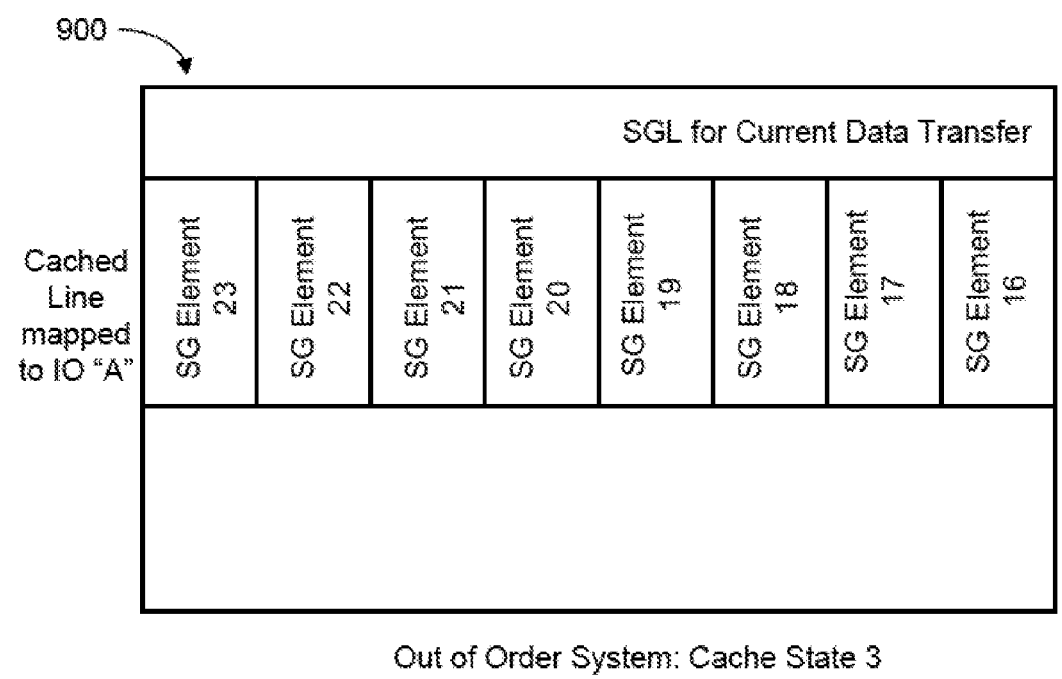
FIG. 10 shows a cache state after a first fetch and a pre-fetch operation in the out of order system of FIG. 9.

To better illustrate this issue; let us consider the example of the SGL containing 34 SG elements as shown in FIG. 8. Let us consider three transfers each using SG12, SG27, and SG14 respectively. The initial cache state is the same as shown in FIG. 4, but may now be referred to as cache state 1 of the out of order system. As the first required SG element (SG12 in our example) is not available in the cache line, the pre-fetching operation pre-fetches the next eight SG elements into the cache line. After the first pre-fetch operation, the required SG element SG12 is cached in the cache line 900 as shown in FIG. 9 by pointer 902. This state is referred to as cache state 2 of the out of order system. As SG12 is the element required for the LBO of the current transfer, SG12 is used for the transfer. As the pointer traversed four elements from SG8 to SG11 prior to arriving at the required SG12, the next four elements would be pre-fetched and the cache state would appear as shown in FIG. 10. This state is referred to as cache state 3 of the out of order system.

Figure 11:
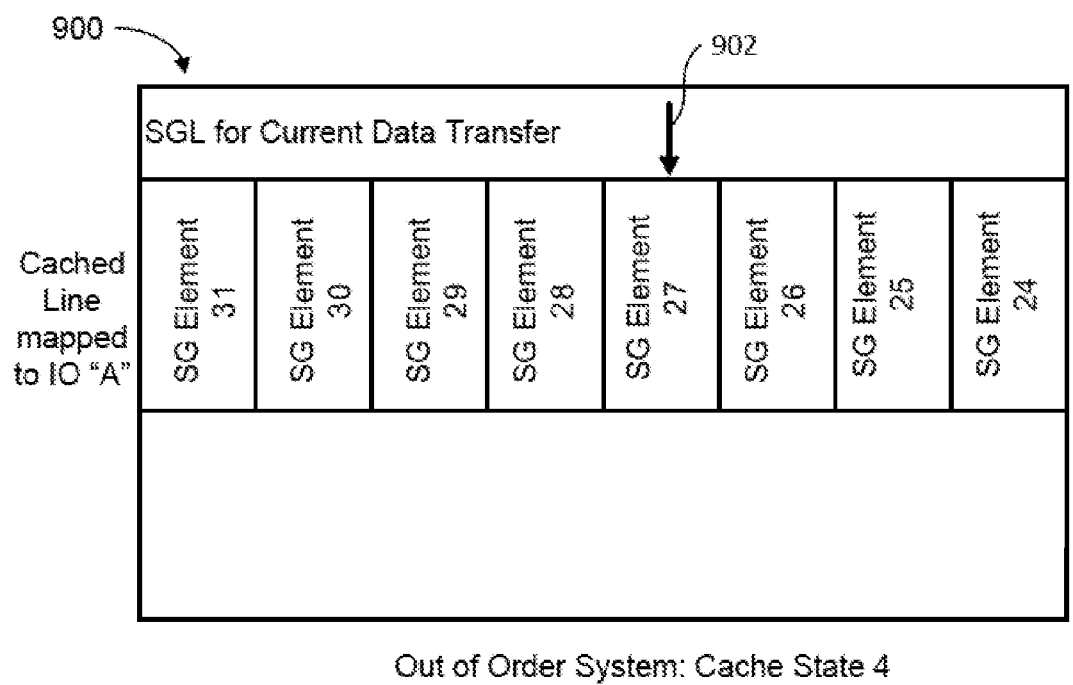
FIG. 11 shows a cache state after a first fetch, a pre-fetch, and a second fetch operation in the out of order system of FIG. 9.

Recall that our example includes three transfers each using SG12, SG27, and SG14 respectively. Therefore, the next transfer request requires SG element SG27. However, the cache line does not include SG27 as shown in FIG. 10. As the offset required is beyond the offset of the last entry in the cache line (recall that our cache is implemented with eight SG elements), the cache will fetch the next eight elements and the cache state would appear as shown in FIG. 11. This state is referred to as cache state 4 of the out of order system. This fetching operation results in caching of the required SG element, SG27, which is used for the transfer.

Figure 12:
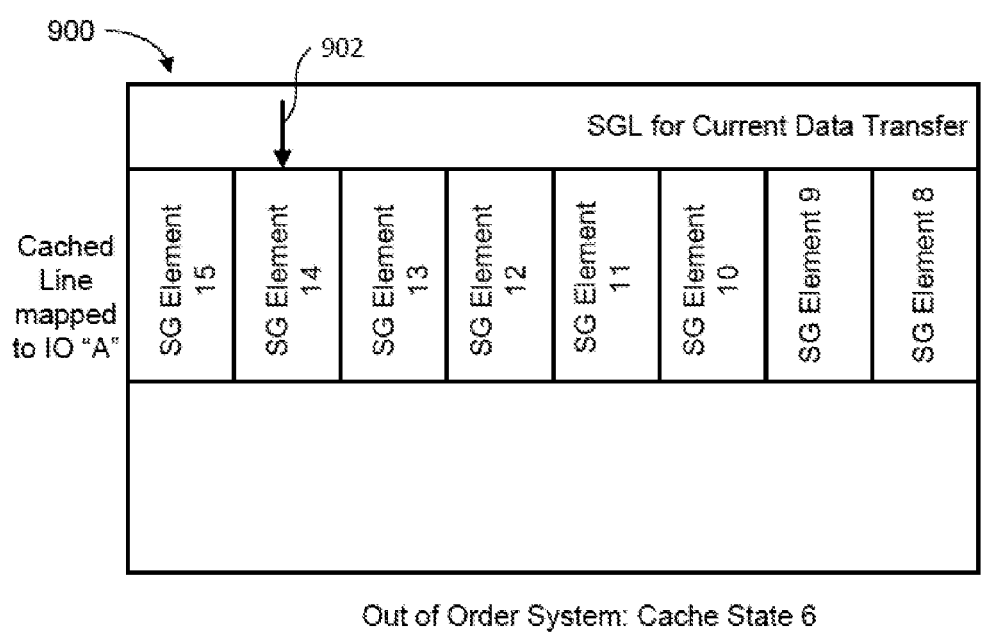
FIG. 12 shows a cache state after starting from the beginning and another fetch operation in the out of order system of FIG. 9.

In our example, the next transfer request requires SG14. However, the LBO is now behind the SG elements present in the cache line. In order to reach SG14, we now have to start traversing the SGL from the beginning, that is, go back to the cache line state as shown in FIG. 4, but now referred to as cache state 5 of the out of order system. However, the required offset (that is, the SG element SG14) for the transfer is not found in the initial eight elements and hence another fetch is required to arrive at the cache state as shown in FIG. 12. This state is referred to as cache state 6 of the out of order system. The cache state now includes the required SG element, SG14, which is then used for the transfer.

Based on the above example, we can understand how out of order transfer makes the cache traverse up and down the SGL, discarding existing cache contents, fetching new elements and later fetching older elements leading to thrashing. Thrashing makes SGL Caching no more useful, as it heavily degrades performance and leaves the systems performance at the mercy of IO randomization pattern.

An obvious solution for this address thrashing is the traditional implementation of downloading entire SGL list. However, this solution is a memory intensive solution, and SGLs will have to be kept either in on-chip or off-chip memory adding to costs and efficiency issues.

Figure 13:
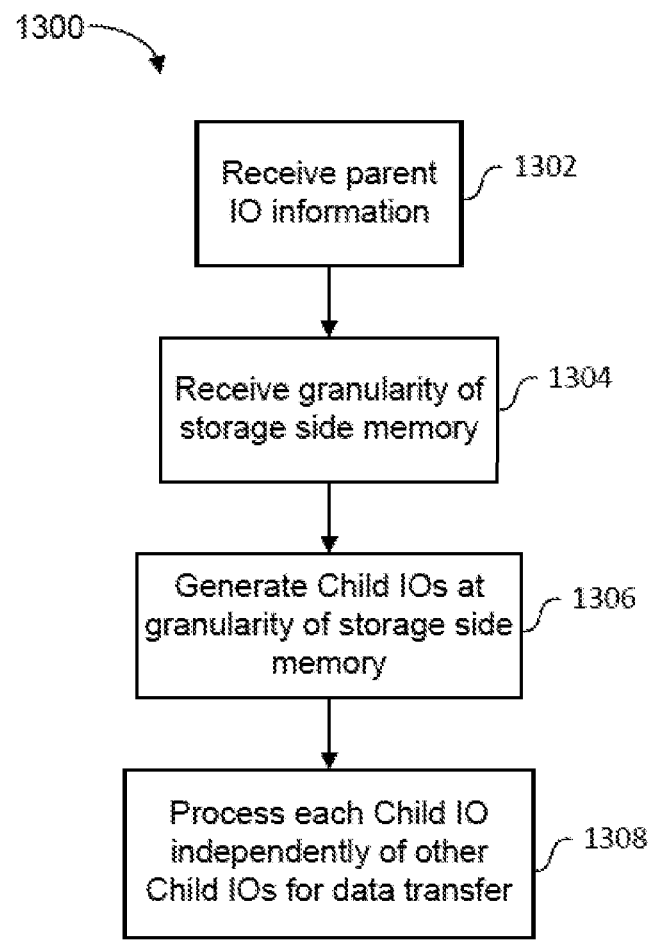
FIG. 13 shows a flowchart for handling data transfer in an out-of-order system according to an aspect of the present disclosure.

According to an aspect, the present disclosure provides a method for handling SGLs for out of order systems as shown in the flowchart of FIG. 13. The method involves generating multiple Child IOs from an original IO (referred to as Parent IO in the present disclosure), each Child IO being at the granularity of a storage side memory; generating separate SG lists for each Child IO; and processing each Child IO independently of other Child IOs and in order within each Child IO for data transfer.

In an example embodiment, the method uses information about a parent IO received at 1302 and granularity of the storage side memory received at 1304. Child IOs are generated at the granularity of the storage side memory at 1306. Each Child IO is processed in-order and independently of other Child IOs for data transfer at 1308.

In an example, the segmenting or "chopping-off" of the original or parent IO into multiple Child IOs may be at the granularity of SSD page size or the minimum accessible chunk size defined by flash translation layer (FTL) in the SSD Controller or the minimum offsets which a target device can use. A page is the smallest unit that can be read or programmed. It is typically about 4 KB, 8 KB, 16 KB or 32 KB in size. The FTL is a component of the SSD controller which maps Logical Block Addresses (LBA) from the host to Physical Block Addresses (PBA) on the drive using a mapping table. Ideally, the mapping table should be maintained in the same granularity of the page size, but this creates a huge space requirement. In order to reduce the space requirement, the FTL defines "minimum accessible chunk size" that essentially becomes smallest unit that can be read or programmed in to SSD drive. Since, according to embodiments of the present disclosure, the parent IO's are chopped-off at the granularity of the SSD page size or the minimum accessible chunk defined by the FTL to create the child IOs; the Child IO transfer becomes independent of each other and flash latency difference are not visible during child IO transfer. That is, an out-of-order IO transfer can now be processed as if it were an in-order IO transfer avoiding the cache thrashing problem discussed earlier. Also, there is no need to process Child IOs belonging to a particular Parent IO in order. As described earlier, the term "granularity" is used in the present disclosure as referring to both the granularity of the SSD page size and "minimum accessible chunk size" that essentially becomes smallest unit that can be read or programmed in to SSD drive as well as the minimum offsets which a target device can use.

Figure 14:
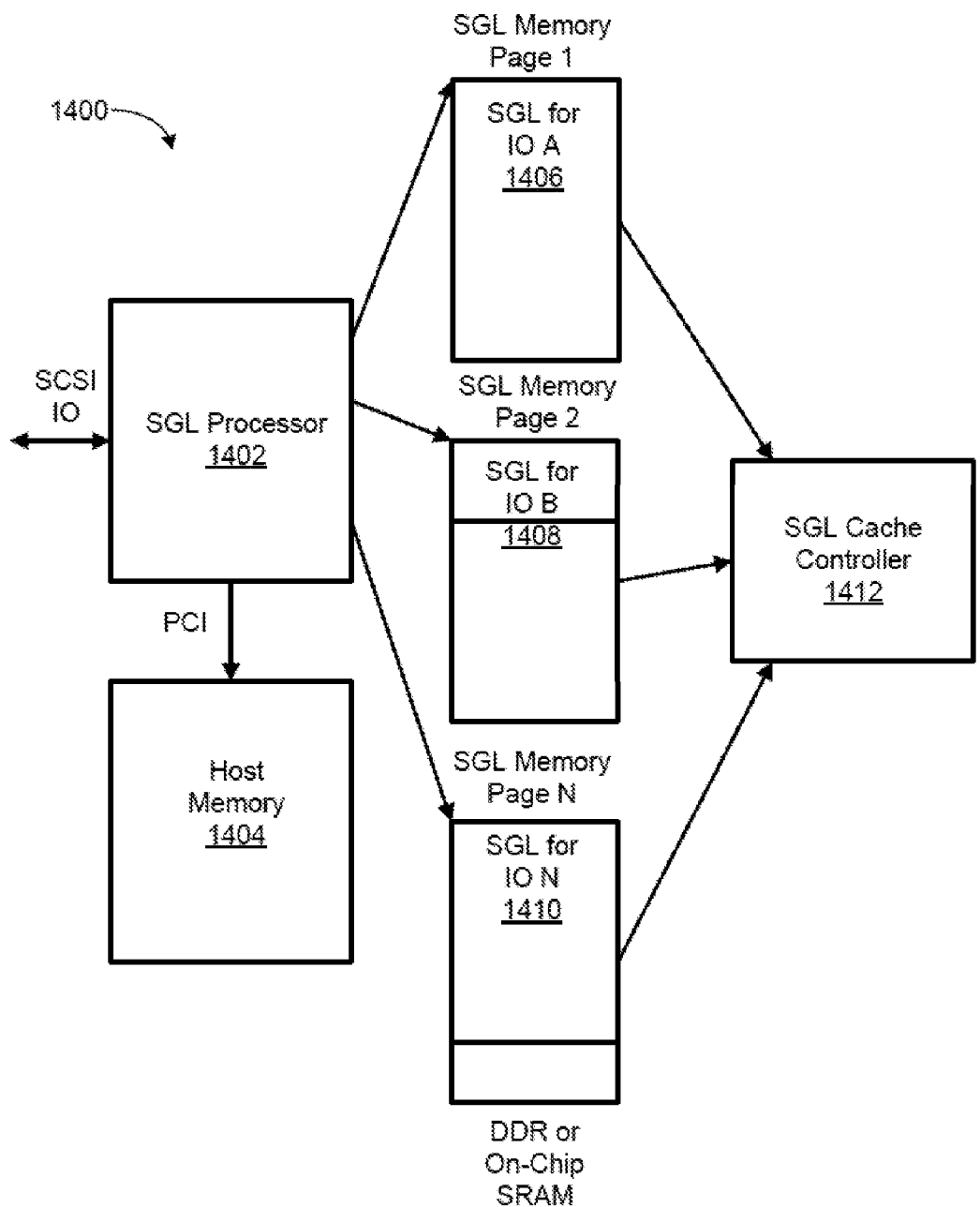
FIG. 14 is a system for handling data transfer in an out-of-order system according to an aspect of the present disclosure.

According to an aspect, the present disclosure provides a system for handling SGLs for out of order systems as shown in FIG. 14. The system 1400 includes an SGL processor 1402 and an SGL Cache Controller 1412. The SGL Processor 1402 receives information about the Parent IO and the granularity of the storage side memory 1404 from an IO controller (not shown). The SGL Processor 1402 also receives information as to where the SGL of the Patent IO is located in the host memory 1404 as well as instructions as to where the chopped SGLs (that is, the SGLs of the Child IOs) have to be buffered. For example, the SGLS of Child IOs A 1406, B 1408, . . . and N 1410 may be stored at SGL Memory page 1, 2, . . . , N etc. Once the Child IOs are generated, the SGL Cache Controller 1412 processes each Child IO independently of other Child IOS for data transfer. As each Child IO is generated at the granularity of the storage side memory, the SGL Cache Controller 1412 can process the Child IOs independently of each other and in-order. Thus, an out-of order IO transfer is transformed into an in-order IO transfer and the problem of thrashing is avoided.

The method and apparatus for transforming an out-of order IO transfer into an in-order IO transfer will now be described is further detail using the earlier example of the out-of-order data transfer using SG elements SG12, SG27, and SG14.

First, the 34 SG elements of the SGL of the IO "A" of FIG. 8 are chopped into multiple Child IOs, each Child IO at the granularity of the storage side memory. FIG. 15 shows multiple Child IOs of the SGL of the IO "A" of FIG. 8 according to an aspect of the present disclosure. The multiple Child IOs are generated by chopping off the parent IO "A" containing 34 SG elements into 8 Child IOs labeled Child IO A to Child IO H. Each Child IO is generated at the granularity of the SSD page size or the minimum accessible chunk size defined by the FTL. For example, if the page size or the minimum accessible chunk size of the host SSD memory is 4 KB, each Child IO is generated at the granularity of 4 KB. Using the length field information in the SG elements of the parent IO "A", multiple Child IOs can be generated to point to 4 KB of data to be transferred. In the example shown in FIG. 13, Child IOs A, B, and D each having 2 SG elements of the parent IO are at the 4 KB granularity. Child IOs E, F, and G include 3 SG elements, Child IO H includes 4 SG elements, and Child IO C includes 9 SG elements, respectively, at the 4 KB granularity.

It is noted that when an SG element in a parent IO corresponds to a memory size that is greater than the granularity of the storage side memory, the SG element may be split across multiple Child IOs. Thus, in-order processing of each Child IO is guaranteed according to the aspects of the present disclosure.

Figure 17:
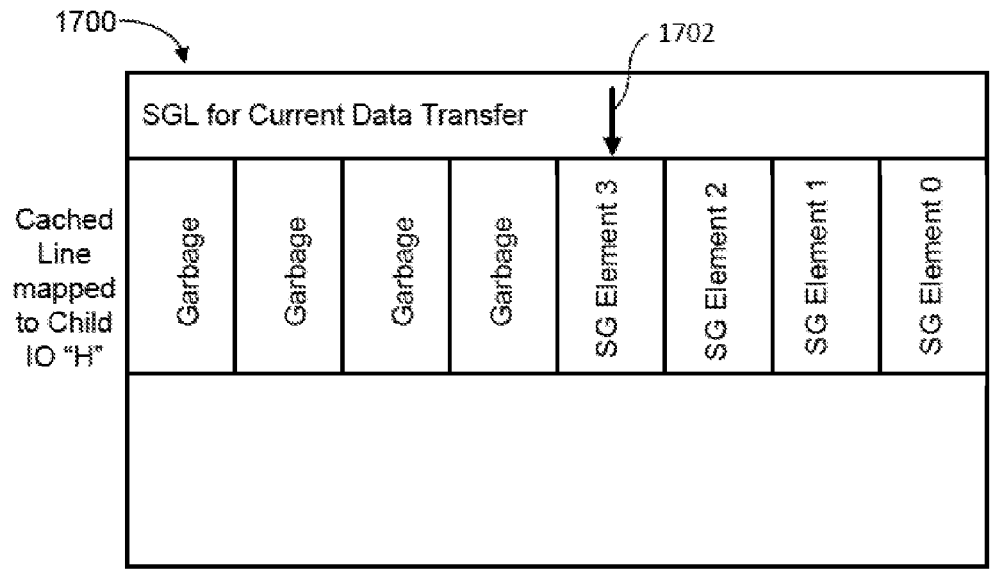
FIG. 17 shows a cache state after a first fetch operation in Child IO "H" of FIG. 14 according to an aspect of the present disclosure.
Figure 18:
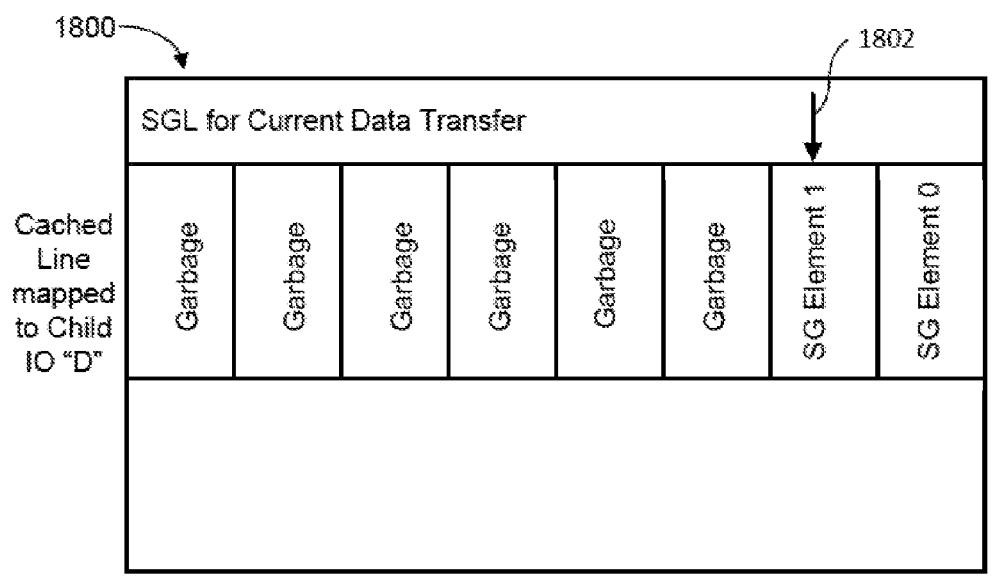
FIG. 18 shows a cache state after a first fetch operation in Child IO "D" of FIG. 14 according to an aspect of the present disclosure.

Recall our example of data transfer involving SG Elements 12, 27 and 14. We now review the same data transfer using aspects of the present disclosure. For transferring data involving SG Element SG12, the SGL List for Child IO C is used. After the first pre-fetch operation, the required SG Element SG12 (SG Element 8 of Child IO "C") is not cached in the cache line 1600 as shown in FIG. 16(*a*), and referred to as out-of-order cache state 1. Therefore, further fetching is done to fetch the required SG Element SG12 as denoted by pointer 1602 in FIG. 16(*b*), and referred to as out-of-order cache state 2. As the required SG Element SG12 (SG Element 8 of Child IO "C") is now cached, it is used for the data transfer. Unlike the previous example, the cache state does not have to traverse to SG Element SG27 for the next data transfer. Instead, since each Child IO is independent, data transfer involving SG Element SG27 can be handled by processing Child IO H. The required SG Element SG27 (SG Element 3 of Child IO "H") is cached in the cache line 1700 as shown in FIG. 17 by pointer 1702. Similarly, data transfer involving SG Element SG14 can be accomplished by processing Child IO D. The required SG Element SG14 (SG Element 1 of Child IO "D") is cached in the cache line 1800 as shown in FIG. 18 by pointer 1802. Thus, by chopping off the parent IO into independent Child IOs, for example at the granularity of the SSD page size or the minimum accessible chunk size defined by the FTL of the SSD drive, we can avoid the problem of thrashing and improve system performance.

In an example, the SGLs for Child IOs may be generated sequentially and fairly across all the Parent IO. For example, SGLs for a specific number of Child IOs belonging to a particular parent IO may be generated and then the process may be moved to another Parent IO irrespective of whether all Child IOs of the first parent IO have been processed or not. Since the method creates SGLs for a number of Child IOs belonging to a particular IO and then moves on to Child IOs belonging to another IO; the method tends to be fair across all the IOs, while improving performance and reducing need of on-chip/off-chip memory for data reordering. Alternatively, Child IOs may be generated for IO 0 before moving on to created Child IOs for IO 1, etc. For example, for a SCSI IO of 256 KB, at a page size of 4 KB, 64 Child IOs are generated in accordance with aspects of the present disclosure. To achieve fairness, 8 Child IOs belonging to a parent IO may be processed at a time before moving to the next parent IO and processing eight of its Child IOs. Fairness may be achieved using a round-robin allocation scheme or other such schemes known to a person skilled in the art.

In an example, the Child IOs may be generated and stored in on-chip or off-chip memory based on the performance requirement of the system. For example, separate SGLs for each Child IO may be created and written in off-chip DDR or in on-chip SRAM by the SGL Processor 1402. Since SGLs are created for a few Child IOs rather than downloading the SGL for entire Parent IO, the amount of on-chip SRAM or off-chip DDR needed is significantly reduced.

In another example, the SGL Processor 1402 may track the status of processing of each Child IO to determine the completion of the parent IO data transfer. The SGL Processor may then send the completion status to host controller when all the associated Child IOs have been processed.

In another example, the generation of the SGL for the Child IOs may be done very close to data transfer so it is exactly not in the command phase or in the data phase, but before the data phase, for example, at the end of the command phase. An advantage of generating the SGL for the Child IO close to start of the data phase is the reduction of on-chip memory required to store the SGLs. Typically, a significant number of IO's are active during a transfer. The IO controller keeps most of them in command phase. Once all the required control structures are set up, an IO is brought into the data phase where actual data transfer occurs. Therefore, generating the SGLs at the end of the command phase helps in reducing the amount of on-chip memory needed to store them. Also, timing efficiency may be enhanced.

In an example, the SGL Processor 1402 may direct an internal Cache Controller (not shown) to fetch SGL List for the Original IO from the host memory 1404 prior to generating the Child IOs.

In an example, the SGL Processor 1402 may accept request for generating the Child IO SGL List using descriptors. For example, the descriptors may be used to provide information regarding the size and location of where the generated SGL should be written etc.

In an example, the SGL Processor 1402 generates the Child IOs in a sequential order. In addition, since each Child IO is generated at the granularity of the SSD page size or at the minimum accessible chunk defined in the FTL, data transfer within a Child IO will occur in order only.

In an example, the SGL Processor 1402 may fetch Parent IO SG elements and then create SGLs for Child IOs, when flash controller issues flash memory requests or back-end requests. For example, this may be performed when the latency of the front end interface (e.g., a PCI) is higher than the SSD storage side memory.

In an example, in case a parent IO has no context (older cached content) present in the SGL Cache, a cache line may be allocated for it and context information for the older IO may be written in a table called eviction buffer table.

In an example, the DDR/On-Chip RAM space (for Child IO SGL) may be divided into pages based on the amount of memory available to store or dump the generated SGLs for the Child IOs. The unit of contiguous memory space available to dump the generated SGLs for the child IOs is referred to as a page here. Using pages to manage the memory space available to dump the generated SGLs for the child IOs makes it more efficient. For example, the SGL Processor 1402 may receive a page size and the location of the page through a descriptor. After dumping the SGL in the designated location, the SGL Processor 1402 can mark the page as used in the descriptor. When this particular SGL is be used by SGL Cache Controller 1412 for the Child IO data transfer, then the corresponding page becomes free and the descriptor pointing to that memory location/page can be again used by the SGL Processor 1402 to dump another SGL generated for another Child IO. Thus, the SGL Processor 1402 may obtain the page information available for dumping the generated SGLs through descriptors.

In an example, after creating SGL List for the Child IO, the SGL Processor 1402 may update completion and page_index (pointer where the SGL is written) using descriptors.

Embodiments of the present disclosure can be implemented in Flash Controllers, RAID Controllers and IO Controllers that need out of order SGL handling. Any storage system supporting out-of-order IO transfer and using SGL Caching techniques can employ embodiments of the present disclosure. For example, all products involving PCI Flash drives need out-of-order IO support.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for handling Scatter-Gather Lists (SGLs) for a data transfer operation in an out of order system in which at least some data transfers in a Parent input/output (IO) are processed in an out-of-order sequence relative to an order of the transfers in an SGL of the Parent IO, the method comprising:

generating multiple Child inputs/outputs (IOs) from the Parent IO by subdividing the Parent IO, each Child IO being at the granularity of a storage side memory;

generating separate SGLs for each Child IO by subdividing the SGL of the Parent IO;

updating completion information and updating memory address information of the Child IOs using descriptors upon generation of the SGLs for the Child IOs; and performing the data transfers of the Parent IO in the out-of-order sequence by processing the Child IOs independently of one another and in-order within each Child IO based on the SGL of the Child IO, wherein the processing of the Child IOs independently of one another involves caching of the SGL of the Child IO that is associated with each next data transfer without requiring caching of the SGL of one or more Child IOs that are not associated with each next data transfer.

2. The method of claim 1, wherein the granularity of the storage side memory is the smallest unit that can be read or programmed in to the storage side memory.

3. The method of claim 1, wherein the granularity of the storage side memory is a page size of a Solid State Device (SSD) or a minimum accessible size defined in a Flash Translation Layer in a SSD controller.

4. The method of claim 1, wherein the data transfer operation in the out-of-order system includes a plurality of Parent IOs, the method further comprising:

generating the multiple Child IOs sequentially and across the plurality of Parent IOs, and generating SGLs for a predefined number of Child IOs belonging to a first Parent IO and then moving on to generate SGLs for a predefined number of Child IOs belonging to a second Parent IO.

5. The method of claim 1, further comprising:

storing the SGLs of the multiple Child IOs in an on-chip or an off-chip memory.

6. The method of claim 5, wherein when the SGLs of the multiple Child IOs are stored in an on-chip memory, the method further comprising:

dividing the on-chip memory into pages for storing the SGLs of the multiple Child IOs; and providing page information through descriptors.

7. The method of claim 1, further comprising:

tracking a status of processing of each Child IO to determine the completion of the parent IO.

8. The method of claim 7, further comprising:

providing a completion status to a host controller when all Child IOs of the Parent IO have been processed.

9. The method of claim 1, wherein the SGLs for the Child IOs are generated prior to a data phase and at the end of a command phase of the data transfer operation.

10. The method of claim 1, further comprising:

fetching an SGL for the Parent IO from a host memory prior to generating the multiple Child IOs.

11. The method of claim 10, wherein the SGLs for the multiple Child IOs are generated using descriptors in the SGL for the Parent IO.

12. The method of claim 1, further comprising processing the SGL for the Parent IO in sequential order prior to generating the Child IOs.

13. The method of claim 1, further comprising:

allocating a cache line for the Parent IO when the Parent IO has no context in an internal SGL cache; and, writing context information for the Parent IO in a table called eviction buffer table.

14. A Scatter-Gather List (SGL) processor for handling SGLs for a data transfer operation in an out of order system in which at least some data transfers in a Parent input/output (IO) are processed in an out-of-order sequence relative to an order of the transfers in an SGL of the Parent IO, the SGL Processor configured to:

generate multiple Child inputs/outputs (IOs) from the Parent IO by subdividing the Parent IO, each Child IO being at the granularity of a storage side memory;

generate separate SGLs for each Child IO by subdividing the SGL of the Parent IO;

update completion information and update memory address information of the Child IOs using descriptors upon generation of the SGLs for the Child IOs; and control a SGL cache controller, in the performance of the data transfers of the Parent IO in the out-of-order sequence, to process the Child IOs independently of one another, and in-order within each Child IO based on the SGL of the Child IO, wherein the processing of the Child IOs independently of one another involves caching of the SGL of the Child IO that is associated with each next data transfer without requiring caching of the SGL of one or more Child IOs that are not associated with each next data transfer.

15. The SGL processor of claim 14, wherein the granularity of the storage side memory is the smallest unit that can be read or programmed in to the storage side memory.

16. The SGL processor of claim 14, wherein the granularity of the storage side memory is a page size of a Solid State Device (SSD) or a minimum accessible size defined in a Flash Translation Layer in a SSD controller.

17. The SGL processor of claim 14, wherein the data transfer operation in the out-of-order system includes a plurality of Parent IOs, the SGL processor further configured to:

generate the multiple Child IOs sequentially and across the plurality of Parent IOs, and generate SGLs for a predefined number of Child IOs belonging to a first Parent IO and then move on to generate SGLs for a predefined number of Child IOs belonging to a second Parent IO.

18. The SGL processor of claim 14, wherein the SGL processor further configured to:

store the SGLs of the multiple Child IOs in an on-chip or an off-chip memory.

19. The SGL processor of claim 18, wherein when the SGLs of the multiple Child IOs are stored in an on-chip memory, the SGL processor further configured to:

divide the on-chip memory into pages for storing the SGLs of the multiple Child IOs; and provide page information through descriptors.

20. The SGL processor of claim 14, wherein the SGL processor further configured to:

track a status of processing of each Child IO to determine the completion of the parent IO data transfer.

21. The SGL processor of claim 20, wherein the SGL processor further configured to:

provide a completion status to a host controller when all Child IOs of the Parent IO have been processed.

22. The SGL processor of claim 14, wherein the SGL processor further configured to:

generate the SGLs for the Child IOs prior to a data phase and at the end of a command phase of the data transfer operation.

23. The SGL processor of claim 14, wherein the SGL processor further configured to:

fetch an SGL for the Parent IO from a host memory prior to generating the multiple Child IOs.

24. The SGL processor of claim 23, wherein the SGL processor further configured to:
  generate the SGLs for the multiple Child IOs using descriptors in the SGL for the Parent IO.

25. The SGL processor of claim 14, wherein the SGL processor further configured to:
  process the SGL for the Parent IO in sequential order prior to generating the Child IOs.

26. The SGL processor of claim 14, wherein the SGL processor further configured to:
  allocate a cache line for the Parent IO when the Parent IO has no context in an internal SGL cache; and,
  write context information for the Parent IO in a table called eviction buffer table.

27. A Scatter-Gather List (SGL) handling system for handling SGLs for a data transfer operation in an out of order system in which at least some data transfers in a Parent input/output (IO) are processed in an out-of-order sequence relative to an order of the transfers in an SGL of the Parent IO, the SGL handling system comprising:
  a SGL processor configured to:
    generate multiple Child inputs/outputs (IOs) from a Parent IO by subdividing the Parent IO, each Child IO being at the granularity of a storage side memory;
    generate separate SGLs for each Child IO by subdividing the SGL of the Parent IO;
    update completion information and update memory address information of the Child IOs using descriptors upon generation of the SGLs for the Child IOs; and
  a SGL cache controller operatively coupled to the SGL processor, the SGL cache controller configured to, in the performance of the data transfers of the Parent IO in the out-of-order sequence, process the Child IOs independently of one another and in-order within each Child IO based on the SGL of the Child IO, wherein the processing of the Child IOs independently of one another involves caching of the SGL of the Child IO that is associated with each next data transfer without requiring caching of the SGL of one or more Child IOs that are not associated with each next data transfer.

28. The SGL handling system of claim 27, further comprising:
  an on-chip or an off-chip memory to store the SGLs of the multiple Child IOs.

* * * * *